United States Patent
Lee

(10) Patent No.: US 7,194,614 B2
(45) Date of Patent: Mar. 20, 2007

(54) BOOT SWAP METHOD FOR MULTIPLE PROCESSOR COMPUTER SYSTEMS

(75) Inventor: Chun-Liang Lee, Taipei (TW)

(73) Assignee: Inventec Corporation, Taipei (TW)

(*) Notice: Subject to any disclaimer, the term of this patent is extended or adjusted under 35 U.S.C. 154(b) by 464 days.

(21) Appl. No.: 10/795,404

(22) Filed: Mar. 9, 2004

(65) Prior Publication Data

US 2005/0204123 A1 Sep. 15, 2005

(51) Int. Cl.
*G06F 15/177* (2006.01)
*G06F 9/00* (2006.01)

(52) U.S. Cl. .............................. 713/2; 713/1
(58) Field of Classification Search ............... None
See application file for complete search history.

(56) References Cited

U.S. PATENT DOCUMENTS 6,571,347 B1* 5/2003 Tseng .......................... 714/6
2003/0005275 A1* 1/2003 Lam .............................. 713/2

* cited by examiner

*Primary Examiner*—Rehana Perveen
*Assistant Examiner*—Anand B. Patel
(74) *Attorney, Agent, or Firm*—Birch, Stewart, Kolasch, and Birch, LLP

(57) ABSTRACT

A boot swap method for multiple processor computer systems utilizes a baseboard management controller (BMC) to manage the abnormal booting problem of multiple processor computer systems. According to the usage state of the central processing unit (CPU) or the basic input/output system (BIOS) stored in read only memory (ROM), a CPU switching procedure or an ROM switching procedure is executed to select an available CPU and BIOS for booting. The method can greatly increase the system stability.

9 Claims, 4 Drawing Sheets

BOOT SWAP METHOD FOR MULTIPLE PROCESSOR COMPUTER SYSTEMS

BACKGROUND OF THE INVENTION

1. Field of Invention

The invention relates to a method for managing the problem of abnormal booting in a multiple processor computer system. More particularly, the invention relates to a method that uses a baseboard management controller (BMC) to switch among central processing units (CPUs) or read only memory (ROM), thereby managing the problem of abnormal booting.

2. Related Art

Based upon the design concept of highly available systems, it is necessary to have a backup system in order to maintain the normal functioning of the system without any manual problem shooting. This is the main reason for the existence of multiple processor systems. A multiple processor computer system such as a server has several CPUs. Therefore, the system has a higher efficiency and can replace a defective CPU if any error occurs.

The booting procedure for a multiple processor computer system is done by assigning a CPU as the boot CPU (boot strap processor) to process BIOS commands during booting process, initializing the computer system and loading in the operating system (OS). The boot BIOS is stored in the BIOS ROM. Other CPUs during the booting process are defined as application processors and set in the wait state.

When the boot CPU cannot boot, a conventional method is to encode in the BIOS a CPU switching program so that the system can switch from the boot CPU to another application processor. The switching mechanism is shown in FIG. 1.

Another possible problem is that after the boot CPU has been switched to all other CPUs the system and the boot BIOS still cannot boot. This happens when the BIOS ROM is out of order. To solve the BIOS disorder problem, one or even many backup ROM's are proposed as the substitute solution. The backup BIOS stored in a backup ROM is used to restart the booting process. The switching mechanism is shown in FIG. 2.

However, the drawback of the above-mentioned method is that one has to encode a special BIOS to switch the CPUs or to design the ROM boot swap to switch between the BIOSs stored in ROMs. Its electronic circuit is more complicated.

SUMMARY OF THE INVENTION

In view of the foregoing, the invention provides a boot swap method for multiple processor computer systems. It uses a BMC to manage the booting process, to determine whether the CPU and BIOS is malfunctioning, and to execute necessary operations. The method includes the following steps. First, a BMC is used to confirm the abnormality of a booting process. A CPU switching procedure is executed and the system is rebooted. When the CPU switching procedure fails, a ROM switching procedure is executed to reboot the system. The CPU switching procedure swaps between a boot CPU and at least one application CPU via the BMC. The ROM switching procedure swaps between the boot BIOS stored in a boot ROM and a backup BIOS stored in at least one backup ROM.

Using the invention, the BMC can manage the booting problem. The system BIOS and ROM do not require extra designs. The stability of the system can be enhanced too.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

The disclosed method mainly utilizes a baseboard management controller (BMC) to manage the booting process, to determine whether the CPU or BIOS is out of order, and to switch to another CPU or BIOS.

The BMC is originally applied to the intelligent platform management interface (IPMI). It controls the interface between the system management software and the platform management hardware, provides the functions of automatic monitoring, event recording, and control recovering, and can function as the network gate among the system management software, the intelligent platform management bus (IPMB) and the intelligent chassis management bus (ICMB).

The reason that the invention can use the BMC to manage system disorder problems is because the system can use a low pin count (LPC) interface to obtain the information regarding to the system state via the BMC.

Figure 1:
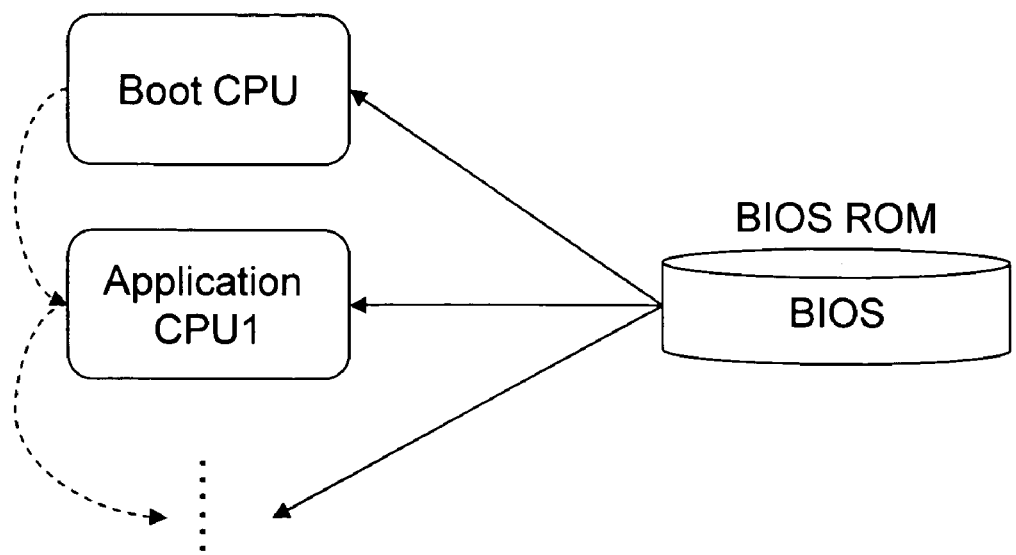
FIGS. 1 and 2 explain the boot swap mechanism of a multiple processor system in the prior art.
Figure 2:
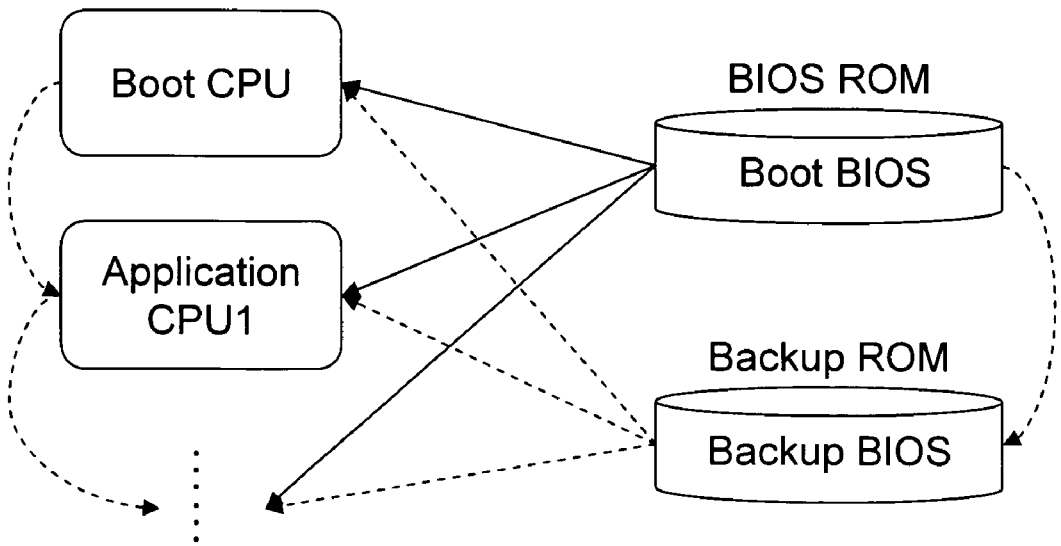
Figure 3:
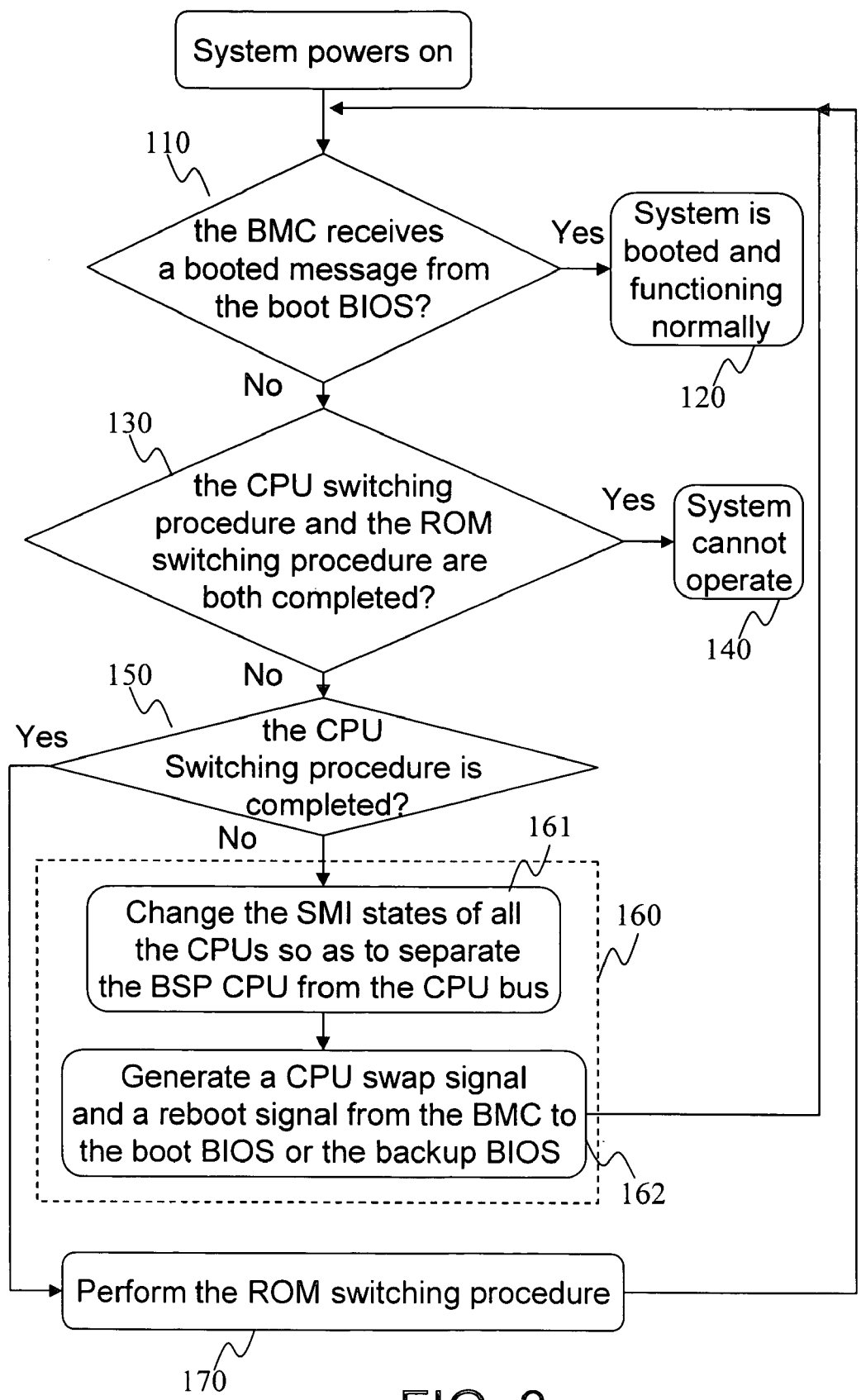
FIG. 3 shows the boot swap mechanism that uses the BMC to manage a multiple processor system according to the invention.

The invention is another whole new application of the BMC. With reference to FIG. 3, the basic execution priority is first performing CPU swap and rebooting and, if failed, then performing ROM swap and reboot.

After the system power is turned on, the first step confirms if the BMC does not receive a booted message from the boot BIOS (step 110). If the booted message has been received, it means that the system is booted and functioning normally (step 120). The BMC is powered by a system backup power supply. Therefore, before the system power is turned on, the BMC is ready. This is why the BMC can be turned on as the system power is on and receive the booting state transmitted from the BIOS.

Afterwards, the system confirms whether the CPU switching procedure and the ROM switching procedure are both completed (step 130). If the system has completed the CPU switching procedure and the ROM switching procedure while the system still cannot be turned on, it means all CPUs have errors and the system cannot operate (step 140). The only solution is manual problem shooting, such as replacing the CPUs.

The system confirms whether the CPU switching procedure is completed (step 150). If not, the system immediately performs the CPU switching procedure (step 160).

The CPU switching procedure in step 160 includes two detailed steps: changing the SMI (System Management Interrupt) states of all the CPUs so as to separate the BSP CPU from the CPU bus (step 161). (The BSP CPU refers to the bootstrap processor, the default processor for booting the computer. In the CPU switching procedure, it should be replaced as the previous CPU used for booting); generating a CPU swap signal and a reboot signal from the BMC to the boot BIOS or the backup BIOS (step 162). After the system is rebooted, it returns to step 110 to confirm the booting state.

If in step 150 the CPU has been switched, the system then performs the ROM switching procedure (step 170). This procedure switches the default booting BIOS from the boot BIOS in the BIOS ROM to a backup BIOS in a backup ROM. The backup BIOS is then used to turn on the system. More explicitly, the BMC generates a ROM switching signal to a complex programmable logic device (CPLD) to switch to the backup ROM. The system generates a system reboot signal to the backup BIOS in the backup ROM. Once the system is rebooted, it returns to step 110 to confirm the booting state.

Figure 4:
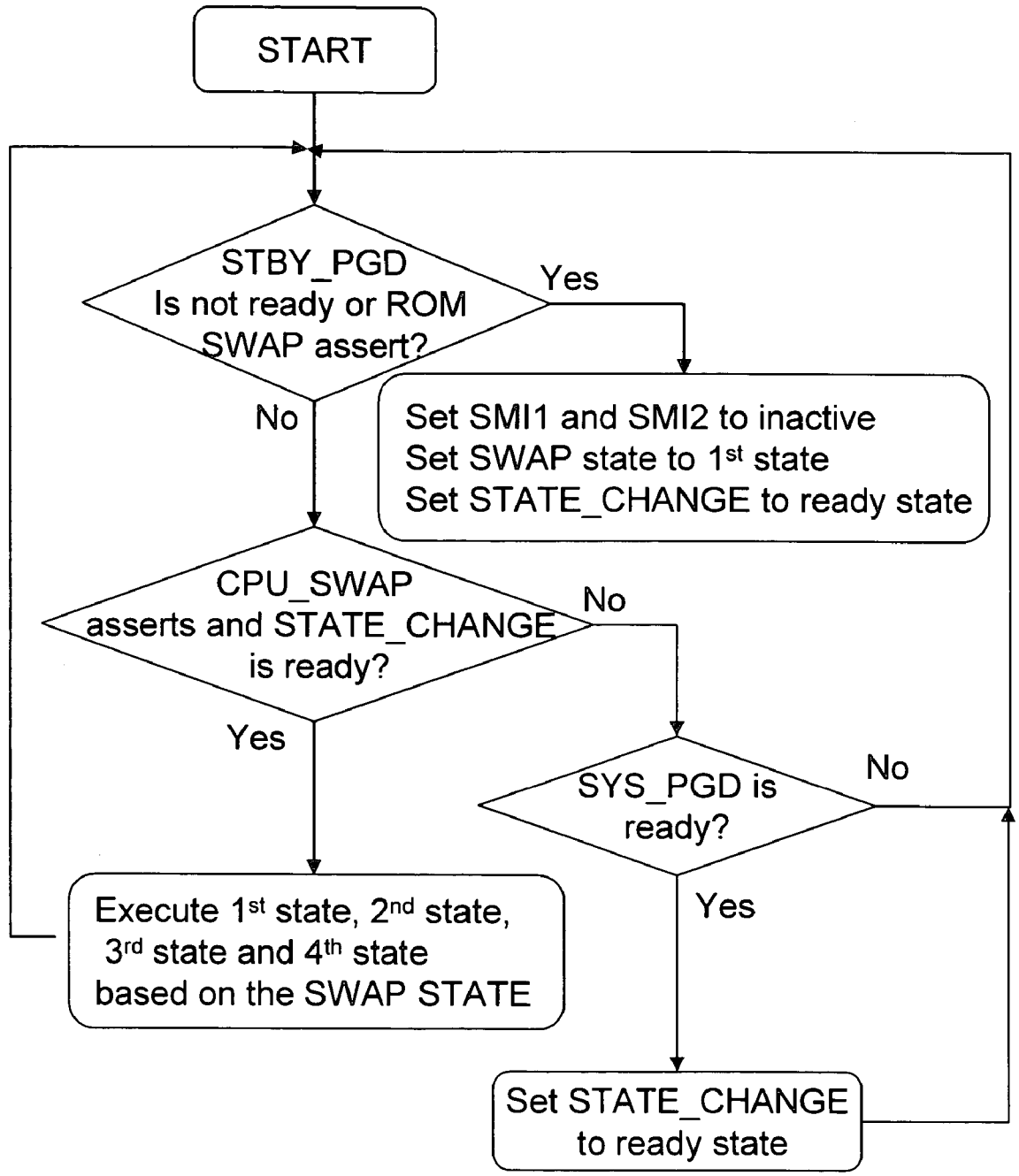
FIG. 4 shows the CPU switching procedure of the invention.

FIG. 4 explains the procedures executed in the BMC when performing the CPU swap. SMI1 and SMI2 are two system management interrupts (SMI's) on the BMC. SWAP refers to the switching state. STBY_PGD, ROM_SWAP, STATE_CHANGE, SYS_PGD, and CPU_SWAP are functional parameters of the control program in the BMC. STBY_PGD is the standby state. ROM_SWAP is the ROM swap state. STATE_CHANGE refers to the state change. SYS_PGD is the system reboot state. CPU_SWAP is the CPU swap state. The CPU swap in the drawing contains four states, making the BMC know to which CPU the system has switched. The execution contents of each state are described as follows:

(1) The execution contents of the first state include:
 a. Set SMI1 at LOW (low voltage);
 b. Set SMI2 at HIGH (high voltage);
 c. Set SWAP to the second state;
 d. Set STATE_CHANGE as CHANGE.
(2) The execution contents of the second state include:
 a. Set SMI1 at HIGH;
 b. Set SMI2 at LOW;
 c. Set SWAP to the third state;
 d. Set STATE_CHANGE as CHANGE.
(3) The execution contents of the third state include:
 a. Set SMI1 at LOW;
 b. Set SMI2 at LOW;
 c. Set SWAP to the fourth state;
 d. Set STATE_CHANGE as CHANGE.
(4) The execution contents of the fourth state include:
 a. Set SWAP to the fourth state;
 b. Set STATE_CHANGE as CHANGE.

Figure 5:
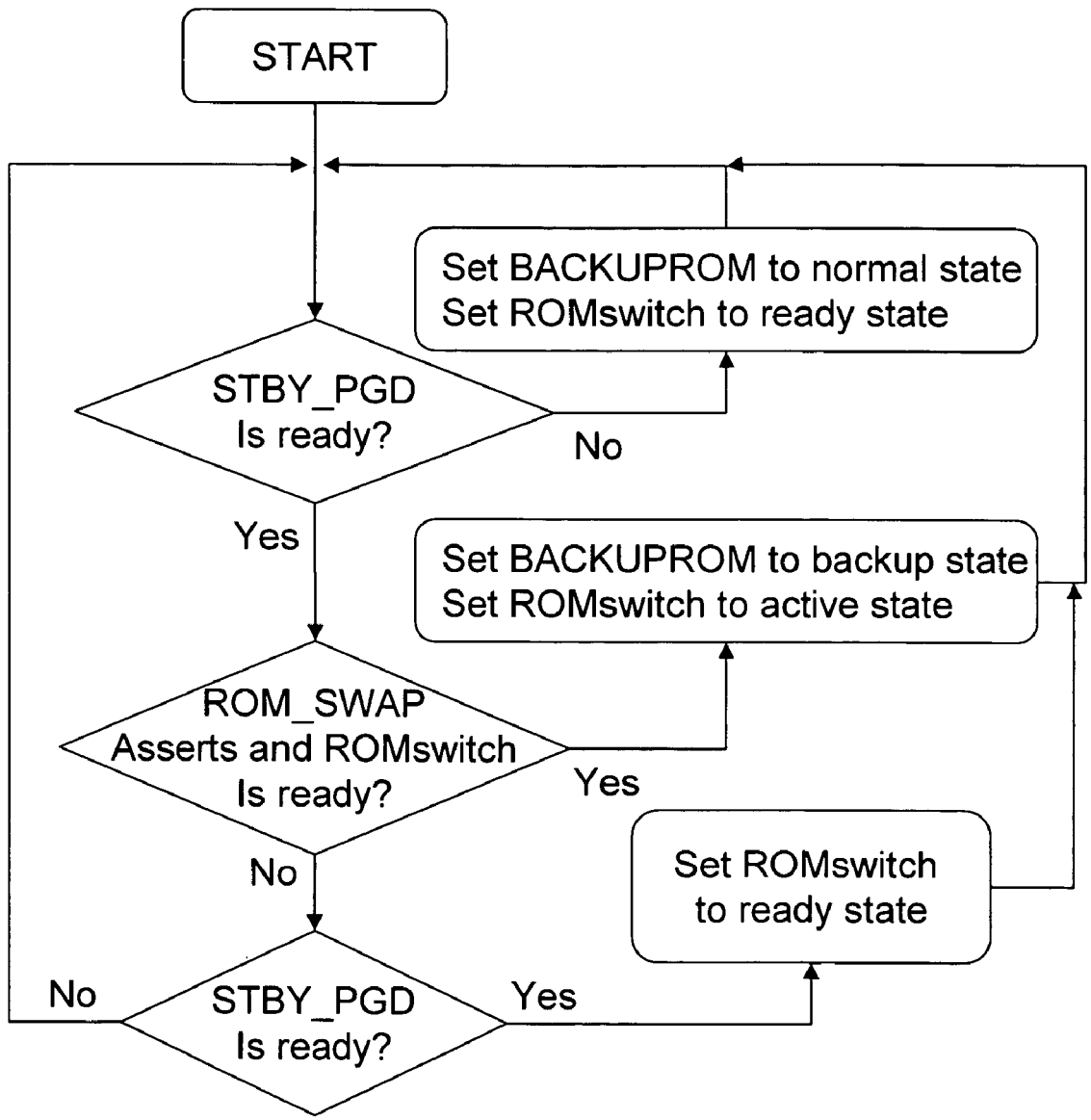
FIG. 5 shows the ROM switching procedure of the invention.

FIG. 5 shows the detailed steps of using the BMC to perform ROM swap. BACKUPROM represents the backup ROM state. According to the invention, the backup ROM can be in either the normal state of the backup state. ROMswitch represents the functional parameters of the ROM switching state.

Following the CPU and ROM procedure outlined in FIGS. 4 and 5, when the booting process encounter abnormality the BMC first performs the CPU swap in FIG. 4. If the booting process is still unsuccessful, the ROM swap in FIG. 5 is then executed.

Certain variations would be apparent to those skilled in the art, which variations are considered within the spirit and scope of the claimed invention.

What is claimed is:

1. A boot swap method for multiple processor computer systems, comprising the steps of:
 confirming booting abnormality via a BMC (board management controller); and
 performing a CPU (central processing unit) switching procedure and rebooting the system wherein the CPU (central processing unit) switching procedure comprises:
  changing the SMI (system management interrupt) states of all the CPUs to separate the previous used CPU from a CPU bus; and
  generating a CPU switching signal and a reboot signal to the boot BIOS or the backup BIOS via the BMC;
 wherein the CPU switching procedure switches between a boot CPU and at least one application CPU using the BMC;
 wherein a further step of performing a ROM (read only memory) switching procedure and rebooting is executed if the booting process still fails after the CPU switching procedure; and
 wherein via the BMC the ROM switching procedure switches a BIOS used for booting from a boot BIOS stored in a boot ROM to at least one backup BIOS stored in at least one backup ROM.

2. The method of claim 1, wherein the BMC provides a ROM switching signal to a complex programmable logic device (CPLD) to switch to the backup ROM and provides a system reboot signal to the backup BIOS in the ROM switching procedure.

3. The method of claim 1, wherein the booting abnormality refers to that the BMC does not receive a booted message of successful booting from the boot BIOS or the backup BIOS.

4. The method of claim 1 further comprising a step of confirming that the CPU switching procedure and the ROM switching procedure are not completed once the booting abnormality is confirmed.

5. The method of claim 4 further comprising a step of confirming that the CPU switching procedure is not completed before performing the CPU switching procedure.

6. A boot swap method for multiple processor computer systems, comprising the steps of:
 confirming booting abnormality via a BMC (board management controller); and
 performing a CPU (central processing unit) switching procedure and rebooting the system;
 wherein the CPU switching procedure switches between a hoot CPU and at least one application CPU using the BMC;
 wherein a further step of performing a ROM (read only memory) switching procedure and rebooting is executed if the booting process still fails after the CPU switching procedure;
 wherein a further step of confirming that the CPU switching procedure and the ROM switching procedure are not completed once the booting abnormality is confirmed;
 wherein via the BMG the ROM switching procedure switches a BIOS used for booting from a boot BIOS stored in a boot ROM to at least one backup BIOS stored in at least one backup ROM.

7. The method of claim 6 further comprising a step of confirming that the CPU switching procedure is not completed before performing the CPU switching procedure.

8. The method of claim 6, wherein the BMC provides a ROM switching signal to a complex programmable logic device (CPLD) to switch to the backup ROM and provides a system reboot signal to the backup BIOS in the ROM switching procedure.

9. The method of claim 6, wherein the booting abnormality refers to that the BMC does not receive a booted message of successful booting from the boot BIOS or the backup BIOS.

* * * * *